United States Patent
West

(10) Patent No.: US 11,165,564 B1
(45) Date of Patent: *Nov. 2, 2021

(54) SCALABLE DATA MANAGEMENT

(71) Applicant: SkedgeAlert, Inc., Tacoma, WA (US)

(72) Inventor: Darryl Pennock West, Berkeley, CA (US)

(73) Assignee: SkedgeAlert, Inc., Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,756

(22) Filed: Mar. 31, 2021

Related U.S. Application Data

(63) Continuation of application No. 17/124,255, filed on Dec. 16, 2020, now Pat. No. 10,979,217.

(60) Provisional application No. 63/108,231, filed on Oct. 30, 2020.

(51) Int. Cl.
  *G06F 21/00* (2013.01)
  *H04L 29/06* (2006.01)
  *H04L 9/08* (2006.01)
  *H04L 9/32* (2006.01)

(52) U.S. Cl.
  CPC ............ *H04L 9/0819* (2013.01); *H04L 9/085* (2013.01); *H04L 9/0861* (2013.01); *H04L 9/3297* (2013.01)

(58) Field of Classification Search
  CPC ..... H04L 9/0819; H04L 9/085; H04L 9/3297; H04L 9/0861
  See application file for complete search history.

(56) References Cited

U.S. PATENT DOCUMENTS

| | | | |
|---|---|---|---|
| 7,472,181 B2 | 12/2008 | Hollinger et al. | |
| 7,930,474 B2 * | 4/2011 | Kano | G06F 3/0689 |
| | | | 711/112 |
| 10,216,754 B1 * | 2/2019 | Douglis | G06F 16/1744 |
| 10,282,667 B2 | 5/2019 | Gagne et al. | |
| 2005/0027579 A1 | 2/2005 | Tiourine et al. | |
| 2007/0250370 A1 | 10/2007 | Partridge et al. | |
| 2011/0038476 A1 | 2/2011 | Anisimov et al. | |
| 2014/0223436 A1 | 8/2014 | Steiner | |
| 2017/0124526 A1 | 5/2017 | Sanderford et al. | |
| 2019/0122760 A1 | 4/2019 | Wang | |
| 2019/0334907 A1 | 10/2019 | Rodden et al. | |

OTHER PUBLICATIONS

Office Communication for U.S. Appl. No. 17/033,172 dated Jan. 29, 2021, pp. 1-15.
Office Communication for U.S. Appl. No. 17/124,255 dated Feb. 10, 2021, pp. 1-7.

(Continued)

*Primary Examiner* — Lisa C Lewis
(74) *Attorney, Agent, or Firm* — John W. Branch; Branch Partners PLLC

(57) ABSTRACT

Embodiments are directed to managing resources over a network. Objects that each correspond to a separate key container may be provided such that each separate key container includes a region key, a shard key, a nonce key. A data center and a data store may be determined for each object based on the region key and the shard key included in each separate key container such that a value of the region key corresponds to the data center and a value of the shard key corresponds to the data store.

20 Claims, 12 Drawing Sheets

(56) References Cited

OTHER PUBLICATIONS

Office Communication for U.S. Appl. No. 17/124,255 dated Feb. 24, 2021, pp. 1-7.
Office Communication for U.S. Appl. No. 17/033,172 dated Apr. 20, 2021, pp. 1-13.
Office Communication for U.S. Appl. No. 17/033,172 dated Jul. 1, 2021, pp. 1-5.

* cited by examiner

SCALABLE DATA MANAGEMENT

CROSS-REFERENCE TO RELATED APPLICATIONS

This Utility Patent Application is a Continuation of U.S. patent application Ser. No. 17/124,255 filed on Dec. 16, 2020, now U.S. Pat. No. 10,979,217 issued on Apr. 13, 2021, which is based on previously filed U.S. Provisional Patent Application No. 63/108,231 filed on Oct. 30, 2020, the benefit of the filing dates of which are hereby claimed under 35 U.S.C. § 119(e) and § 120 and the contents of which are each further incorporated in entirety by reference.

TECHNICAL FIELD

The present invention relates generally to resource management, and more particularly, but not exclusively, to providing scalable data management for resource management.

BACKGROUND

Modern organizations provide many systems that enable clients, providers, or users to schedule appointments, including, web based portals, telephonic scheduling, model phone apps, and so on. By providing multiple appointment scheduling systems, organizations can provide convenient and reliable means for clients to schedule appointments. Accordingly, organizations are enabled to efficiently manage their resources to service their scheduled appointments. However, appointment scheduling systems often enable clients, providers, or users to cancel appointments. In some cases, some system enable clients to easily or conveniently cancel. However, in some cases, if appointments are canceled, the organizations may be left with unassigned resources that were previously allocated for the now canceled appointment. In some cases, this may cause organizations added costs or lost revenue because they may be unable to reschedule the unassigned resources. In some cases, while organizations may be required to support many users or resources, they may generally cluster around localized geographic regions which may be widely distributed. Accordingly, providing sufficient compute or storage systems absent over-provisioning or under-provisioning may be difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
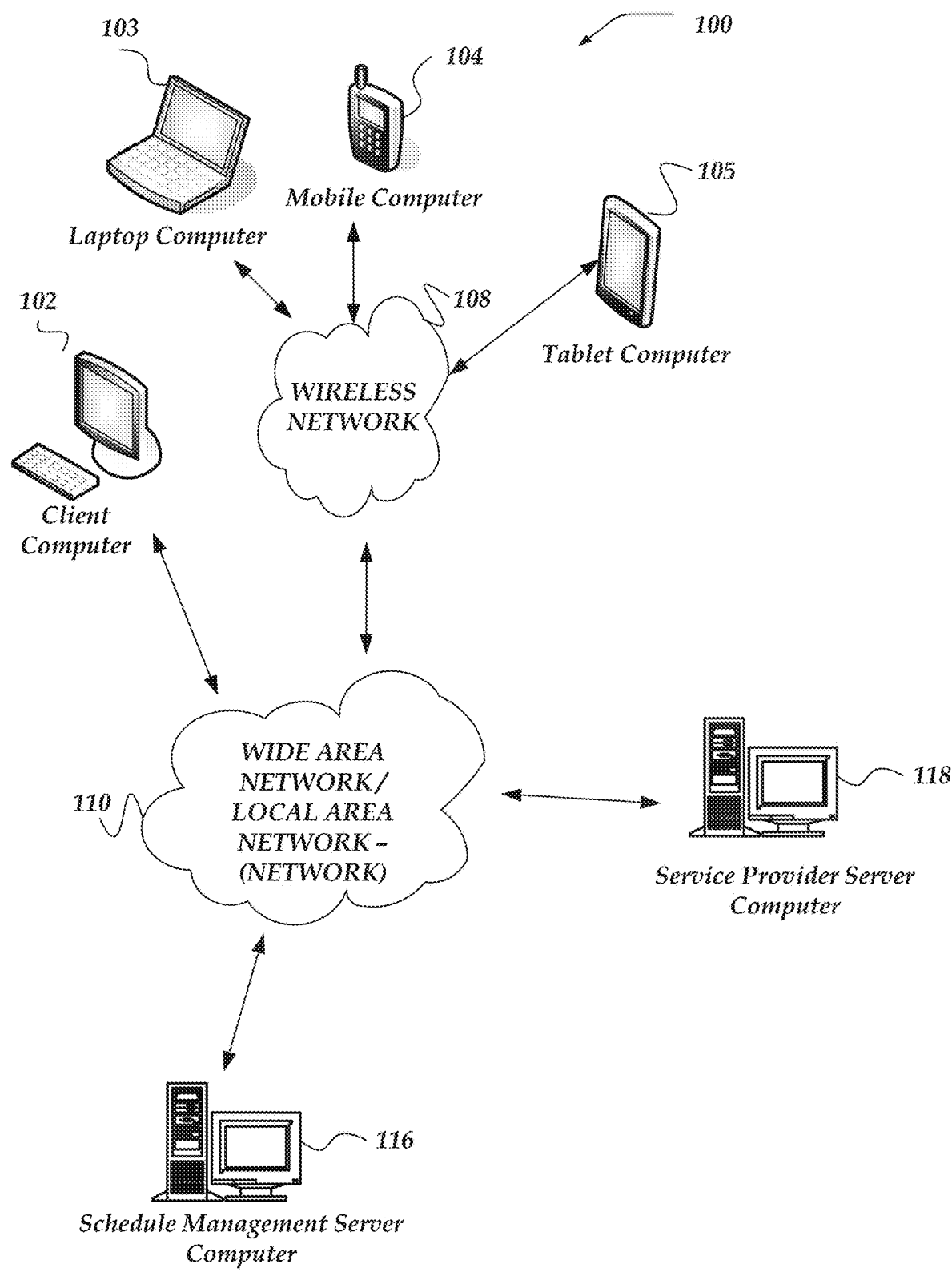
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "resource," or "provider" refer to individuals, groups, or organizations that may offer scheduled services or otherwise employ appointments to schedule if they can provide services to clients. For example, resources or providers may include, physicians, dentists, hair stylists, automobile repair shops, consultants, portrait photographers, or the like.

As used herein the term "client" refers to individuals, customers, groups, or organizations that may have a relationship with an organization that is using appointments to schedule services or otherwise employ appointments to schedule if they can receive services from providers. For example, clients may include, medical patients, dental patients, consumers, employees, volunteers, or the like.

As used herein term, "open appointment" refers to an unfilled appointment that has been scheduled or otherwise allocated resources. Open appointments may be associated with one or more unassigned resources. In some cases, these are the same resources the were initial associated with a scheduled appointment before it became an open appointment. Also, typically, open appointments occur if clients cancel previously schedule appointments. However, if resources become unexpectedly available, open appointments may be associated with the unexpected unassigned resources.

As used herein the term "region key" refers to a key used for determining the data center where an object or entity may be stored. Region key values may be single digit base 36 numbers that may be mapped to data centers.

As used herein the term "shard key" refers to a key used for determining the data store within a data center where an object or entity may be stored. Shard key values may be single digit base 36 numbers that may be mapped to data stores in a data center. Data stores in different data centers may be associated with shard keys having the same value.

As used herein the term "nonce key" refers to a key used for determining or identifying individual objects or entities in a data store. In some cases, nonce keys may be generated by random number generators. Nonce key values may be multi-digit base 36 numbers.

As used herein the term "timestamp key" refers to a key used to represent a timestamp value associated with objects or entities. Often, a value of a timestamp key may correspond to a time an object or entity is created or registered with a scheduling engine. Timestamp key values may be multi-digit base 36 numbers.

As used herein the term, "key container" refers to data structures used to store, region keys, shard keys, nonce keys, timestamp keys, or the like. Key containers may be structured such that particular keys are stored at particular positions or in particular elements of key containers.

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing resources over a network. In one or more of the various embodiments, one or more objects that each correspond to a separate key container maybe provided such that each separate key container includes a region key, a shard key, a nonce key, or the like.

In one or more of the various embodiments, a data center and a data store may be determined for each object based on the region key and the shard key included in each separate key container, wherein a value of the region key corresponds to the data center and a value of the shard key corresponds to the data store, and wherein each object and its separate key container are stored in the data store at the data center.

In one or more of the various embodiments, in response to one or more metrics associated with one or more of the data stores or the data center exceeding a threshold value, performing further actions, including: adding one or more other data stores to the data center; assigning one or more values of the shard key to the one or more other data stores; determining a subsequent data center and a subsequent data store for one or more subsequently provided objects based on the region key and the shard key included in each key container associated with the one or more subsequently provided objects, wherein one or more values of the shard key correspond to the one or more other data stores, and wherein each key container associated with the one or more objects and the one or more subsequently provided objects are unchanged; or the like.

In one or more of the various embodiments, in response to receiving a query that includes one or more query key containers that correspond to one or more query objects, performing further actions, including: determining one or more query region keys and one or more query shard keys from the one or more query key containers, wherein each value the one or more query region keys are base 36 numbers at a first position in each query key container; determining one or more query data centers based on the one or more query region keys; determining one or more query data stores in the one or more query data centers based the one or more query shard keys, wherein the one or more query data stores are in the one or more query data centers; determining the one or more query objects in the one or more query data stores based on a value of each nonce key included in each query key container, wherein each nonce key corresponds to a query object; providing a result for the query that includes the one or more query objects; or the like.

In one or more of the various embodiments, providing the one or more objects may further includes: registering one or more clients or one or more resources with a provider; generating the one or more objects based on the one or more clients or the one or more resources; generating one or more key containers that each correspond to one of the one or more objects; generating a region key value for each object based on one or more data centers, wherein each region key value corresponds to one data center; generating a shard key value for each object based on a random number generator, wherein each shard key value corresponds to one data store; generating a nonce key value for each object based on a random number generator, wherein each digit of the nonce is a base 36 number to reduce a size of the one or more key containers; storing the region key value, the shard key value, and the nonce key value for each object in a corresponding key container, wherein the region key value is stored in a first element of the corresponding key container, and wherein the shard key value is stored in a second element of the corresponding key container, and wherein the nonce key value is stored in a remainder of elements in the corresponding key container; or the like.

In one or more of the various embodiments, providing the one or more objects that each correspond to a separate key container may include storing a timestamp key value based on a base 36 representation of a timestamp for each object that is created in the separate key container to reduce a size of the separate key container.

In one or more of the various embodiments, determining the subsequent data center and the subsequent data store for one or more subsequently provided objects, may include: determining one or more out-of-place objects based on a mismatch of the shard key value in each key container that corresponds to the one or more out-of-place objects and a data store where each out-of-place object is stored; moving each out-of-place object to another data store based on the shard key value for each out-of-place object, wherein the other data store corresponds to the shard key value; or the like.

In one or more of the various embodiments, determining the data center and the data store for each object based on the region key and the shard key may include: determining one or more types of objects associated with the one or more objects; providing one or more route models based on the one or more types; determining the data center and the data store for each object based on the one or more route models and the one or more types of objects; or the like.

In one or more of the various embodiments, the region key, the shard key, and the nonce key may be each comprised of one or more base 36 digits to reduce a size of the separate key container.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, schedule management server computer 116, service provider server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, schedule management server computer 116, service provider server computer 118, or other computers.

Client computers 102-105 may further be configured to include a client application that enables an end-user to log into an end-user account that may be managed by another computer, such as schedule management server computer 116, service provider server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, schedule management server computer 116, service provider server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of schedule management server computer 116, service provider server computer 118, or the like, are described in more detail below in conjunction with FIG. 3. Although FIG. 1 illustrates schedule management server computer 116, or service provider server computer 118 as a single computer, the innovations or embodiments are not so limited. For example, one or more functions of user management server computer 116, or the like, may be distributed across one or more distinct network computers. In one or more of the various embodiments, schedule management server computer 116 or service provider server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
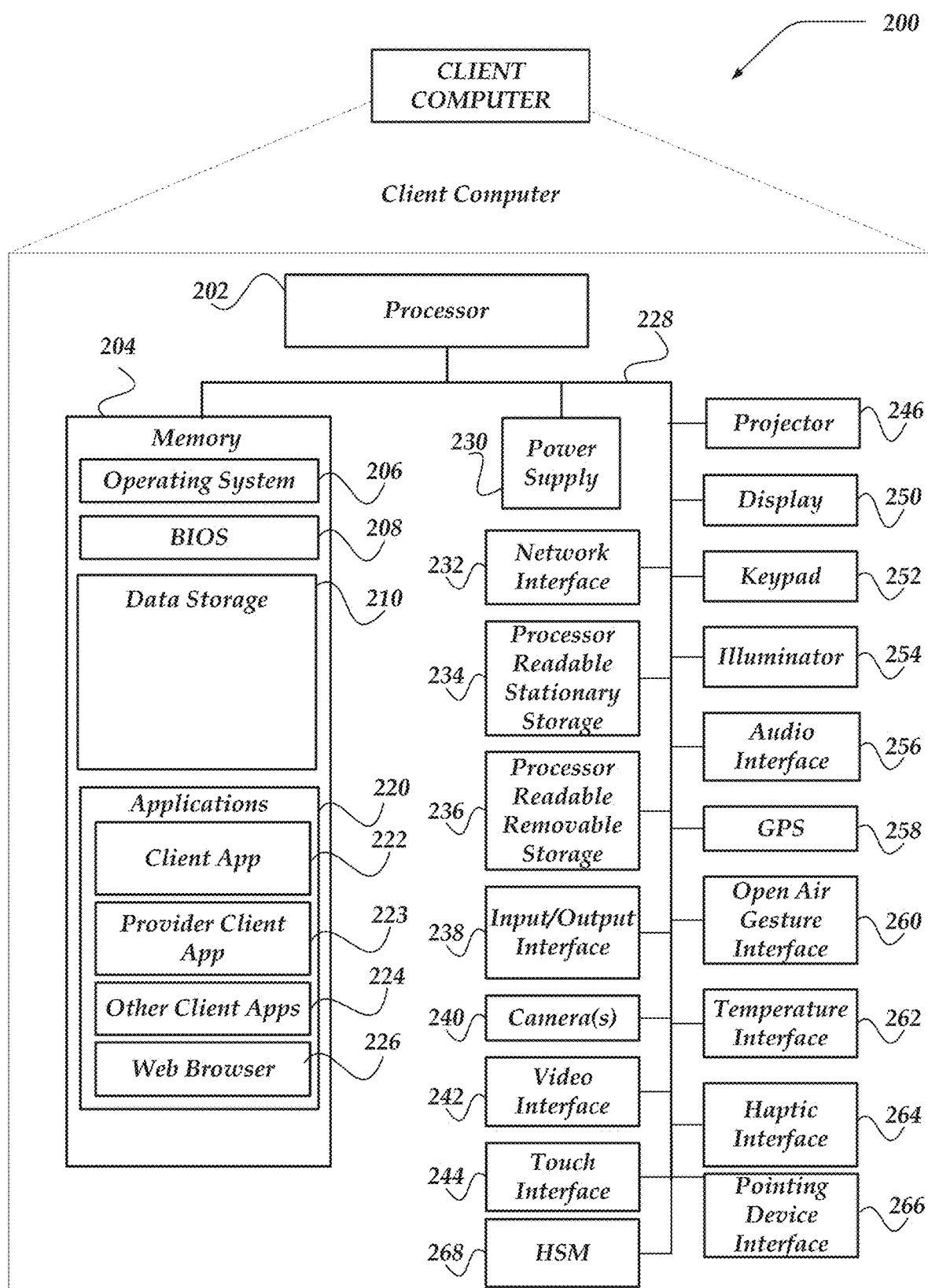
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, customer client application 222, provider client application 223, other client applications 224, web browser 226, or the like. Client computers may be arranged to exchange communications, such as, queries, searches, messages, notification messages, event messages, calendar information, alerts, log data, API calls, or the like, combination thereof, with servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
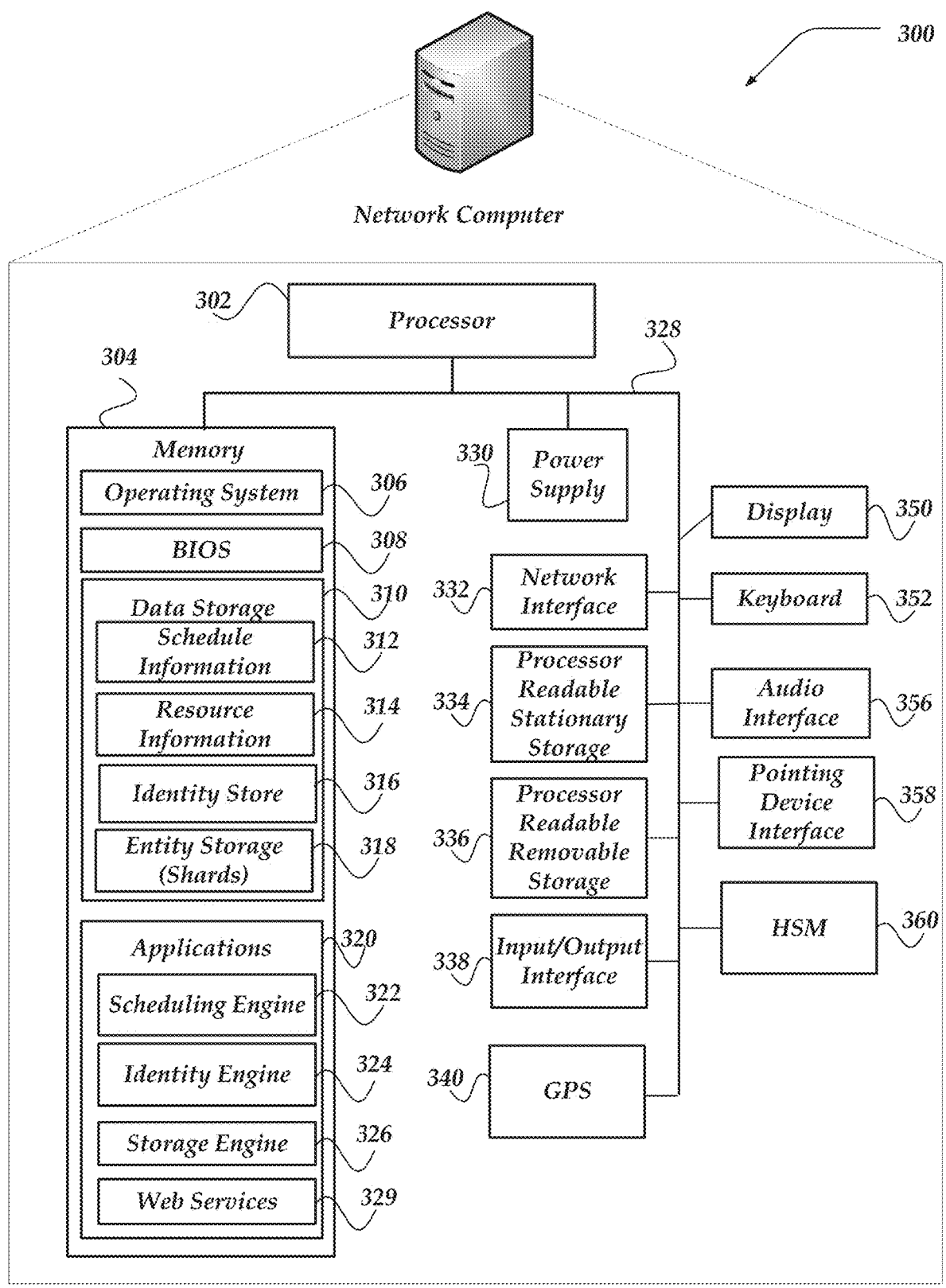
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of schedule management server computer 116 or service provider server computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, scheduling engine 322, identity engine 324, storage engine 326, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, schedule information 312, resource information 314, identity store 316, entity storage (shards) 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include scheduling engine 322, identity engine 324, storage engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, scheduling engine 322, identity engine 324, storage engine 326, web services 329, or the like, may be operative in a cloud-based computing environment. In one or more of the various embodiments, these applications, and others, that comprise a network monitoring computer may be executing within virtual machines or virtual servers that may be managed in a cloud based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to scheduling engine 322, identity engine 324, storage engine 326, web services 329 or the like, may be provisioned and de-commissioned automatically.

Also, in one or more of the various embodiments, scheduling engine 322, identity engine 324, storage engine 326, web services 329, or the like, may be located in virtual servers running in a cloud-based computing environment rather than being tied to one or more specific physical network computers. Likewise, in some embodiments, one or more of scheduling engine 322, identity engine 324, storage engine 326, web services 329, or the like, may be configured to execute in a container-based environment.

Further, network computer 300 may also comprise hardware security module (HSM) 360 for providing additional tamper resistant safeguards for generating, storing, or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
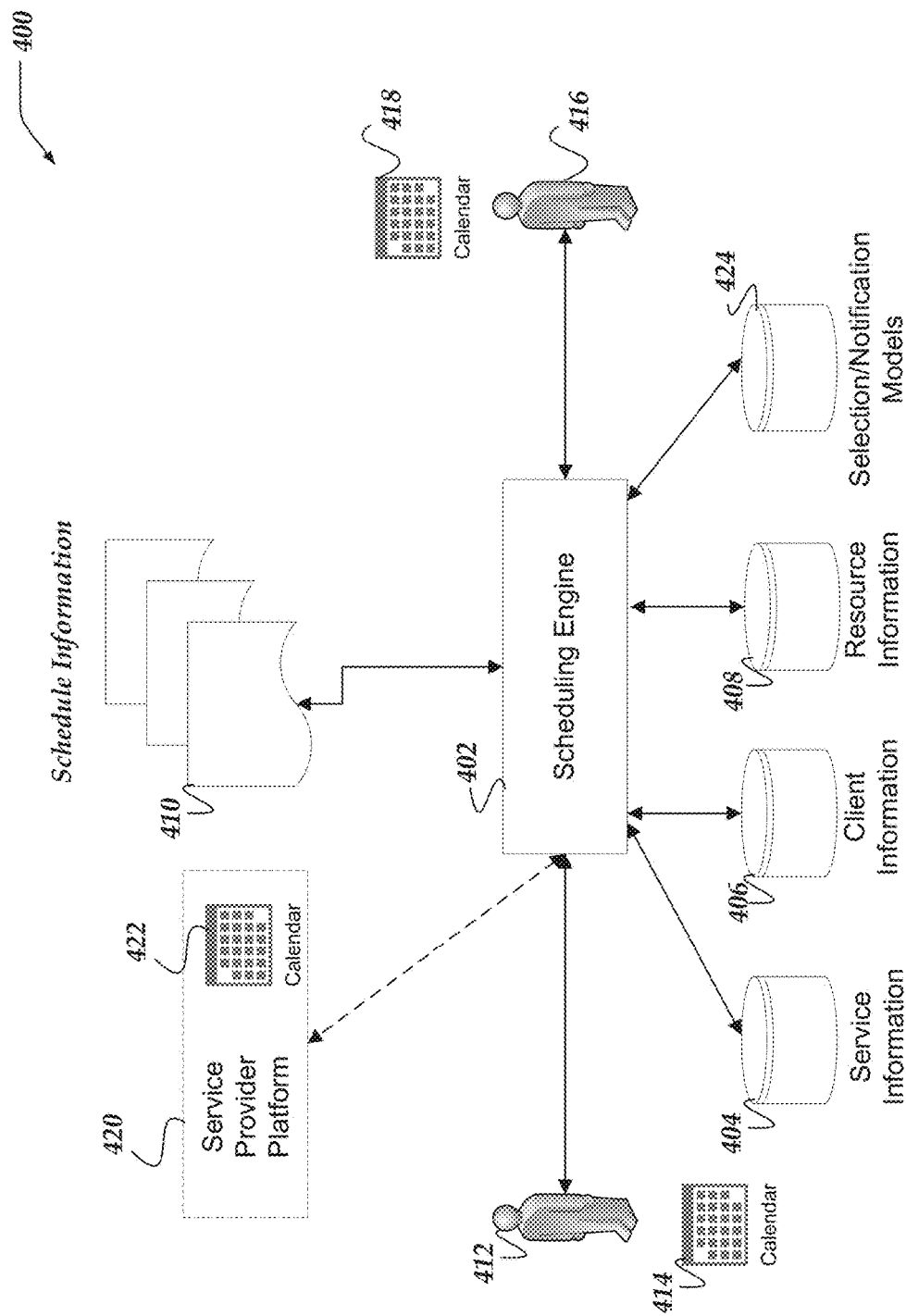
FIG. 4 illustrates a logical architecture of a system for scalable data management in accordance with one or more of the various embodiments.

FIG. 4 illustrates a logical architecture of system 400 for scalable data management in accordance with one or more of the various embodiments. In one or more of the various embodiments, system 400 may be hosted or executed by one network computers, such as, schedule management server computer 116, or the like. In one or more of the various embodiments, system 400 may include: scheduling engine 402, service information 404, client information 406, resource information 408, schedule information 410, resources/providers 412, provider calendars 414, clients 416, client calendars 418, service provider platform 420, service provider platform calendars 422, selection/notification models 424, or the like.

In some embodiments, service provider organizations may be required to use appointment scheduling to efficiently and conveniently allocate resources or providers to clients. This may enable service providers and clients to determine time slots that may be mutually available or otherwise convenient. Naturally, organizations try to set appointments that utilize their resources or providers. Ideally, if providers and clients mutually agree upon an appointment time, resources or providers may be allocated or utilized effectively.

Unfortunately, it is not uncommon for clients to cancel appointments, sometimes at the last minute. Often, service providers may employ various conventional methods to discourage clients from making last minute cancellations such as cancellation fees, or the like. However, cancellation fees rarely compensate for the lost revenue or lost opportunity, especially if the providers associated with canceled appointments cannot be rescheduled with another client for the same appointment slot. Often, organizations may attempt to schedule other clients to fill canceled appointments. However, refilling canceled appointments may be difficult because identifying clients that may be available or willing to take an appointment with little notice may be time consuming or labor intensive.

Accordingly, in one or more of the various embodiments, scheduling engines, such as, scheduling engine 402 may be arranged to enable service providers to rapidly or efficiently refill canceled appointments. In some embodiments, scheduling engines may be arranged to employ information, such as, service information 404, client information 406, resource information 408, organization, or the like, to identify or notify qualified clients that may be willing to refill the appointment slot. Thus, in some embodiments, if other clients accept canceled appointments, the unassigned resources or providers may be utilized to service the clients that refill the canceled appointments.

In some embodiments, service information 404 may represent a data store that includes information about the services associated with appointments. In some embodiments, such information may include, codes, descriptions, labels, as well as criteria for determining qualified clients or eligible providers. Also, in some embodiments, other restrictions or criteria that may influence appointment scheduling, such as, hours of operation, location, or the like.

In one or more of the various embodiments, client information 406 may represent a data store that includes information about clients that may be available. In some embodiments, client information may include demographics, name, address, scheduling preferences (e.g., favored times or days), notification preferences (e.g., blackout periods, do-not-disturb rules, or the like), favored or assigned providers, or the like.

In one or more of the various embodiments, resource information 408 may represent a data store that includes information about resources or providers that may be associated with appointments or canceled appointments. In some embodiments, this information may include, services offered, specialties, certifications, availability, locations, price/cost, or the like.

Accordingly, in one or more of the various embodiments, scheduling engines may be arranged to evaluate information associated with canceled appointments, providers, or clients to determine how or if an appointment may be refilled.

In one or more of the various embodiments, scheduling engines may be arranged to employ calendar information to determine if clients may be qualified for refilling appointments. In some embodiments, scheduling engines may be arranged to compare calendars of clients or providers to determine if an appointment may be refilled.

In one or more of the various embodiments, scheduling engines may be arranged to integrate with one or more service provider platforms to exchange or share provider information, client information, service information, calendars/schedules, appointment information, or the like. Note, in this example, service provider platform 420 is illustrated with dashed lines because in some embodiments integrating with a service provider platform may be optional because in some embodiments providers or clients may work directly with a schedule management platform that may be separate or independent from a service provider platform.

Accordingly, in some embodiments, scheduling engines may be arranged to generate internal representations of schedules or schedule information, such as, schedule information 410 that may be employed for refilling canceled appointments.

In one or more of the various embodiments, scheduling engines may be arranged to employ one or more selection models to select qualified clients for an open appointment. In some embodiments, selection models may be considered data structures that include heuristics, classifiers, rules, instructions, or the like, the may be employed to determine qualified clients from the corpus of known clients. In some embodiments, selection models may be generated or modified by scheduling engines based on various inputs, rules, or the like. In some embodiments, schedule management platforms may be arranged to provide one or more user interfaces that enable users to provide or define input information that may be employed to generate selection models that may be used to determine one or more qualified clients.

Also, in one or more of the various embodiments, scheduling engines may be arranged to employ one or more notification models to determine how to notify qualified clients about open appointments. In some embodiments, notification models may be considered data structures that include heuristics, classifiers, rules, instructions, or the like, that may be employed to determine various notification actions, such as, serial notifications, broadcast notifications, notification order, notification methods, acceptance timeouts, confirmation timeouts, or the like.

Figure 5:
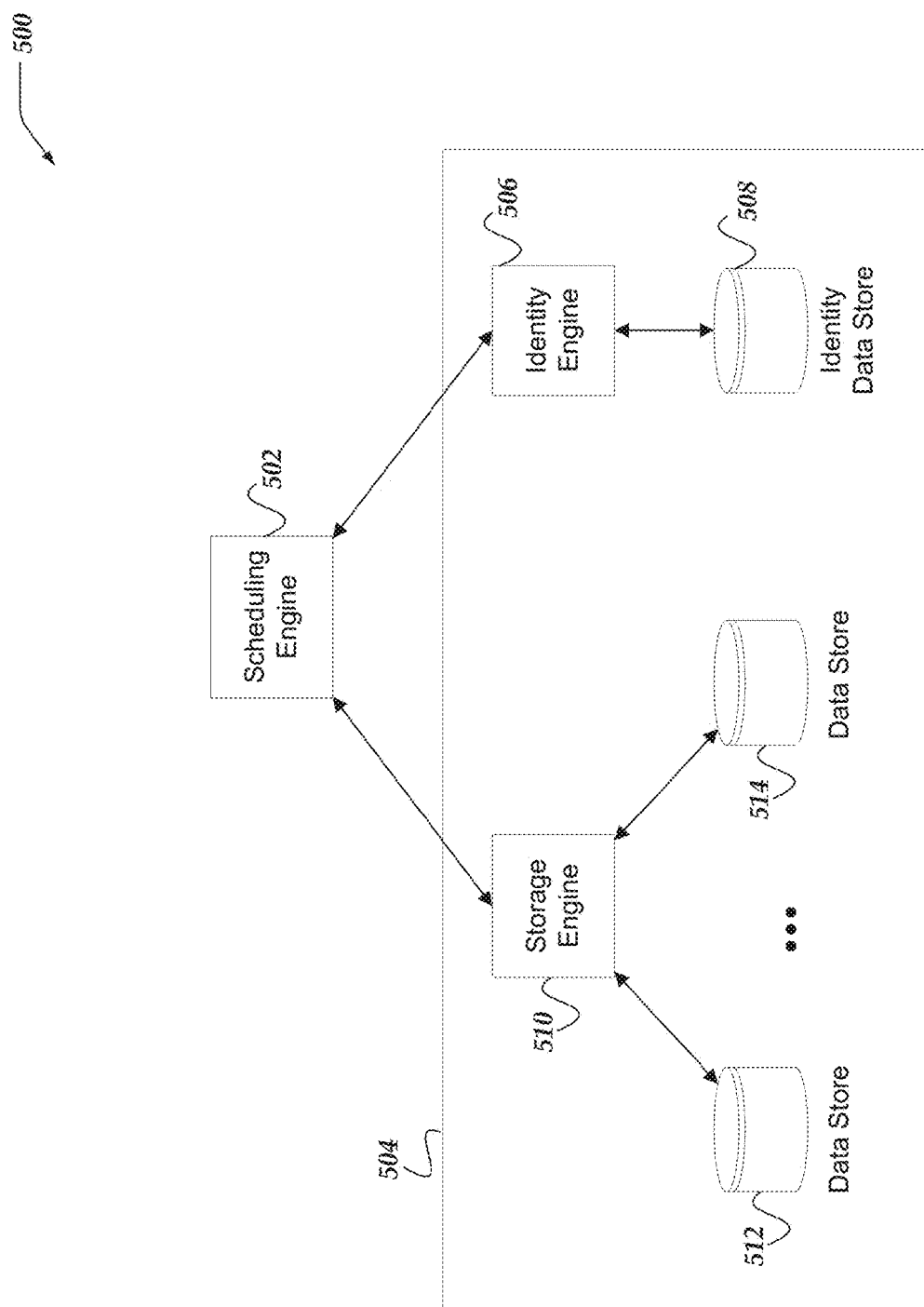
FIG. 5 illustrates a logical schematic of a portion of a schedule management platform for scalable data management in accordance with one or more of the various embodiments.

FIG. 5 illustrates a logical schematic of a portion of schedule management platform 500 for scalable data management in accordance with one or more of the various embodiments. In one or more of the various embodiments, schedule management platforms may be arranged to include one or more scheduling engines, storage engines, identity engines, or the like.

In one or more of the various embodiments, storage engines may be arranged to management the storage or retrieval of the various objects that may comprise a schedule management platforms. In one or more of the various embodiments, data storage for schedule management platforms may be arranged into data centers, In some embodiments, data centers may be distributed around or among different geographic regions. In one or more of the various embodiments, each data center may include one or more data stores that store the actual objects employed by the schedule management platform.

In one or more of the various embodiments, schedule management platform may be arranged to employ one or more identity services that may be employed for validating or authenticating users, clients, resources, platform administrators or the like. In some embodiments, identity services may be arranged to share the same data centers, data stores, or the like, as the rest of a schedule management platforms. For example, in one or more of the various embodiments, identity engines may be arranged to employ the same storage engines as the scheduling engines.

In this example, for some embodiments, scheduling engine 502 may be arranged to process various schedule management requests from one or more clients, one or more resources, service providers, or the like. In some embodiments, scheduling engine 502 may be configured to employ one or more data centers, such as, data center 504 for various data storage or data agreement functions.

In one or more of the various embodiments, scheduling engine 502 may be arranged to employ one or more identity engines, such as, identity engine 506, for authenticating or validating users, clients, resources, or the like. In some embodiments, identity engines may be arranged to provide other services include managing key containers, generating key values for key containers, maintaining an association of key containers with various other types of objects, such as, users, clients, or the like. In some embodiments, identity engines may be arranged to use one or more dedicated data stores, such as, identity data store 508. Alternatively, in some embodiments, identity engines may be arranged use a storage service or one data stores associated with one or more storage engines.

In one or more of the various embodiments, scheduling engines, such as, scheduling engine 510 may be arranged to respond to various data management requests, including creating, updating, or deleting schedule management platform objects. In one or more of the various embodiments, storage engines, such as, storage engine 510 may be arranged to employ one or more data stores, such as, data store 512, data store 514, or the like. In one or more of the various embodiments, scheduling engines may be arranged to employ values from key containers to determine which data store to store objects.

In some embodiments, scheduling engines may be arranged to one or more route models that may be employed to determine the data stores for particular objects. In some embodiments, route models may include one or more rules, instructions, or the like, that may be used with information from key containers for determining where or how to store various objects or object types.

In one or more of the various embodiments, data centers, data stores, or the like, may include different tiers or categories of storage volumes or storage devices. For example, in some embodiments, a data center may include one or more cache tiers comprised high performance storage volumes or storage devices as well as one or more low performance archival storage tiers. Accordingly, in one or more of the various embodiments, route models may be arranged to account for storage tiers, storage volumes, or the like. In one or more of the various embodiments, storage engines may be arranged to work with various cache tiers, archive tiers, cloud object stores, physical storage devices, key value stores, database management systems, or the like. Accordingly, for brevity and clarity, the various types or tiers of data storage system supported by storage engines may be referred to as data stores.

Figure 6:
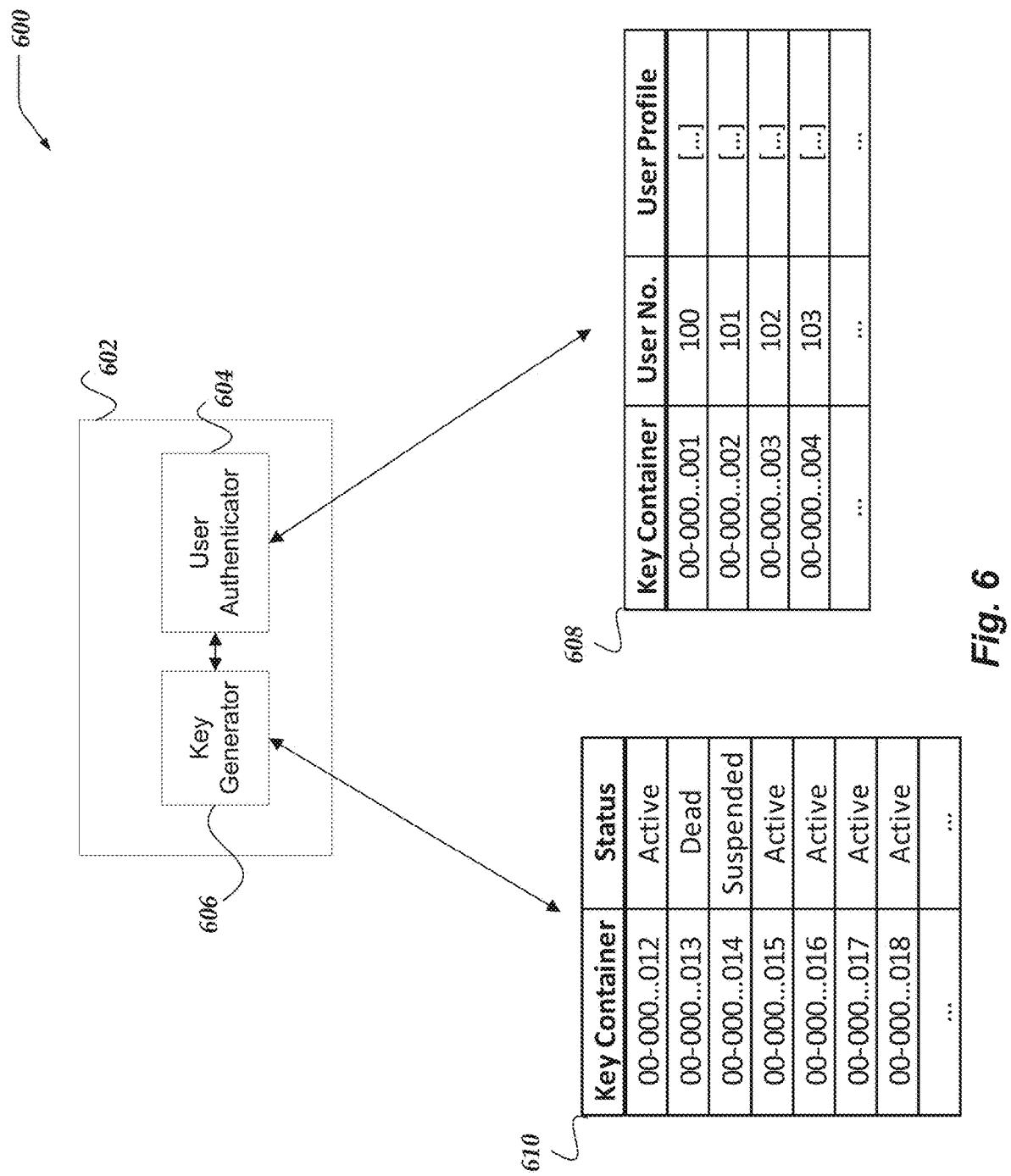
FIG. 6 illustrates a logical schematic of a portion of an identity engine for scalable data management in accordance with one or more of the various embodiments.

FIG. 6 illustrates a logical schematic of a portion of identity engine 600 for scalable data management in accordance with one or more of the various embodiments. In one or more of the various embodiments, schedule management platforms may employ identity engines, such as, identity engine 600 to management or safeguard the identities of users, clients, providers, resources, or the like. For in some embodiments, if a new client of a schedule management platform may be registering with the platform, an identity engine, such as, identity engine 600 may be employed to collect user profile information, including, logon credentials (e.g., passwords, usernames, multi-factor authentication information, or the like), user status, or the like. Accordingly, in some embodiments, identity engines may include one or more user authenticators, such as, user authenticator 604. In some embodiments, user authenticator 604 may be arranged to execute one or more instructions for collecting user or authenticating user credentials, or the like. Also, in some embodiments, authenticators, such as, authenticator 604 may be arranged to integrate with one or more other internal or external services to in part authenticate or authorize users accessing schedule management platforms. In some embodiments, the other services may include conventional services, such as, LDAP, Active Directory, OAuth endpoints, or the like. Also, in some embodiments, the other services may include integrating with a service provider platform, such as, service provider platform 420, or the like. For example, for some embodiments, if a patient client may be registering with a schedule management platform, user authenticator 604 may be arranged to request or confirm patient identifier information from a service provider to validate the user. Likewise, in some embodiments, service providers may provide APIs or interfaces that user authenticators may employ to validate users, clients, patients, providers, resources, or the like.

In one or more of the various embodiments, identity engines may be arranged to include one or more key generators, such as, key generator 606. In some embodiments, key generator 606 may be arranged to manage the generation or allocation of key containers or the various keys contained within key containers. Accordingly, in one or more of the various embodiments, key generators may be arranged to confirm that each key container may uniquely identify one or more object types in the schedule management platform. For example, in some embodiments, key generator 606 may be arranged to ensure that key generated for various types of objects, such as, users, clients, patients, resources, providers, or the like, may be unique across an entire schedule management platform.

Accordingly, in one or more of the various embodiments, key generators may be arranged to provide one or more identity status tables, such as, table 610 for tracking the status of key containers in a schedule management platform. In some embodiments, key generators may be arranged to communicate over a network to reach one or more key generators that may be associated with other data centers of schedule management platforms.

Also, in one or more of the various embodiments, user authenticators may be arranged to coordinate with key generators to assign key containers to users. Accordingly, in this example, user authenticator 604 may provide one or more tables, such as, table 608 for associating user profiles with key containers.

In one or more of the various embodiments, schedule management platforms may be arranged to associate various objects with key containers. In some embodiments, some or all object types may be associated with key containers representing the identity of a given object. Also, in some embodiments, schedule management platforms may be arranged to limit key containers to representing object types that may be anticipated to require or benefit from scalable data management. For example, in some embodiments, a schedule management platform may be configured to provide key containers for users that may be employed to associate one or more objects with their respective users. Thus, in some embodiments, each user may have a generated key container, while each object corresponding with individual users may be associated with their user's key container.

In one or more of the various embodiments, key containers may be arranged to include multiple keys and their key values, such as, region keys, shard keys, timestamp keys, nonce keys, or the like, that in combination are a unique value across one or more portions of a schedule management platform.

In one or more of the various embodiments, key generators may be arranged to determine how one or more key values may be determined based on rules, instructions, filters, maps, or the like, provided via configuration information to account for local requirement or local circumstances. In some embodiments, key containers may be arranged to store values using base 36 representation to enable compact data representation.

Figure 7:
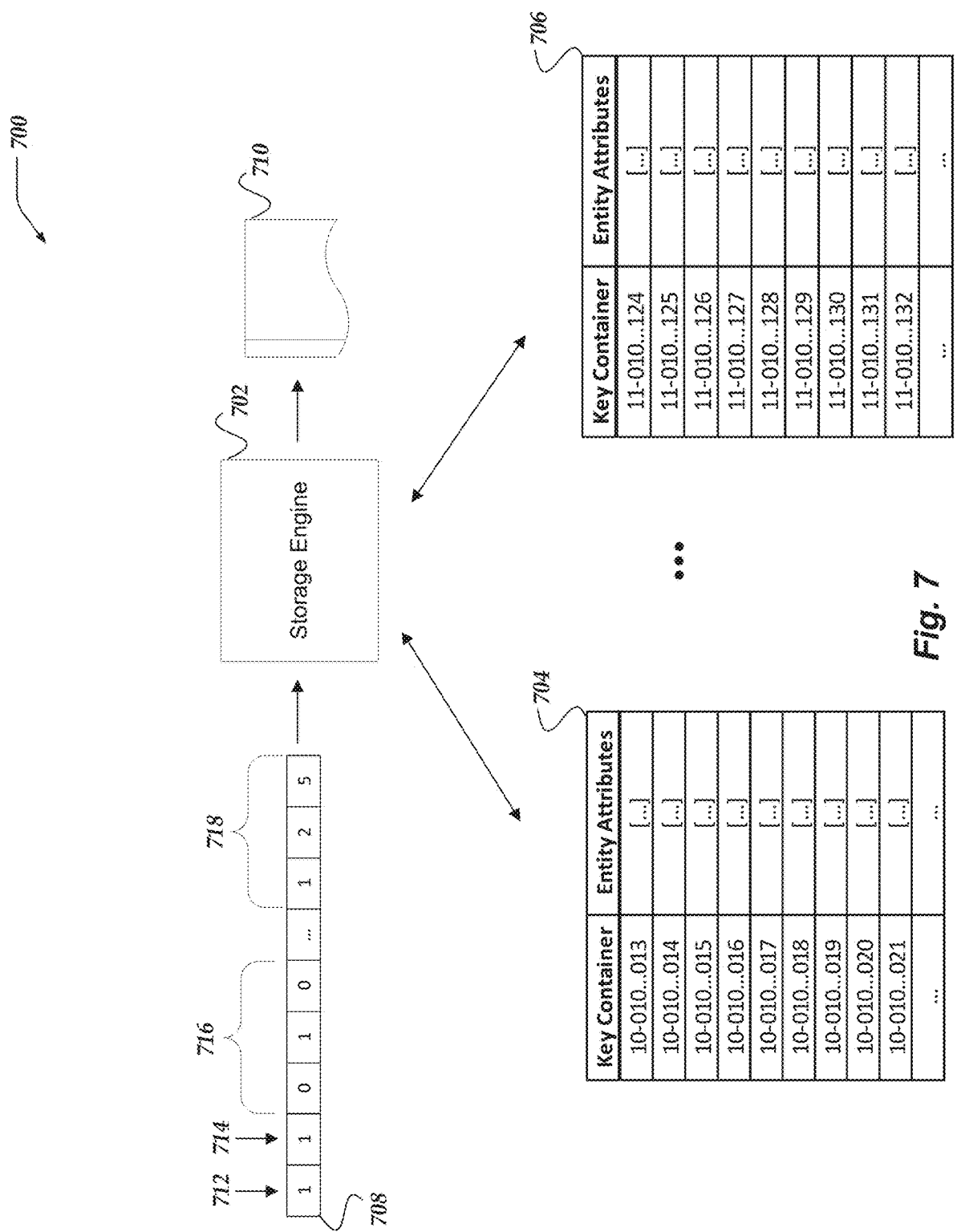
FIG. 7 illustrates a logical schematic of a portion of a storage engine for scalable data management in accordance with one or more of the various embodiments.

FIG. 7 illustrates a logical schematic of a portion of storage engine 700 for scalable data management in accordance with one or more of the various embodiments. In one or more of the various embodiments, schedule management platforms may employ storage engines, such as, storage engine 702 to provide data management services.

In one or more of the various embodiments, storage engines, such as, storage engine 702 may be arranged to manage data stored on one or more data sources in a data center. In this example, for some embodiments, table 704 or table 706 may be considered to represent one or more data stores that may be employed by storage engine 702. In some embodiments, one or more tables may be in each data store managed by storage engines. In some embodiments, one or more data stores managed by scheduling engines may be key values stores, or the like, such that some or all of a individual data store is a single key value store. In this example, table 704 or table 706 may be considered key value stores that employ key containers as the key for various stored objects.

In one or more of the various embodiments, storage engines may be arranged to receive query information that may include one or more key containers. In one or more of the various embodiments, query information may include other information, including object information, filters, sort expressions, patterns, query expressions in various query languages, or the like.

In this example, for some embodiments, key container 708 may be provided to storage engine 702. Accordingly, in some embodiments, storage engine 702 may be arranged to decode key container 708 to determine a data centers and data store that may store the one or more objects associated with key container 708.

In one or more of the various embodiments, storage engines may be arranged to generate key containers using a format that enables various information to be embedded in the key container as one or more keys. In some embodiments, key containers may be arranged to include region keys, shard keys, timestamp keys, nonce keys, or the like. Further, in some embodiments, key containers may be arranged to store certain key values in specific positions or elements of key containers. In this example, various elements may be stored in key container 708 as follows: element 712 may be employed for storing a region key; element 714 may be employed for storing a shard key; elements 716 may be employed for storing a timestamp key; elements 718 may be employed for storing a nonce key.

In one or more of the various embodiments, each element of a key container may be arranged for storing a base 36 number, such that each element may represent 36 values. For example, element 712 may represent base 36 numbers using the ASCII characters 0-9 and A-Z where characters 0-9 represent ten values (0-9) and characters A-Z represent the remaining 26 values. Thus, in some embodiments, each element in key containers may store a value from 0-35.

Accordingly, in some embodiments, region keys may be employed to identify a data center. Thus, in this example, a schedule management platform could employ 36 data centers. Similarly, in some embodiments, shard keys may be employed to identify data stores in a data center. Thus, in this example, a schedule management platform could employ 36 data stores at each data center.

Also, in one or more of the various embodiments, other keys, such as, timestamp 716 may embed additional metadata, or the like, associated with the key container and its corresponding object.

Further, in some embodiments, nonce keys may be employed to uniquely identify an instance of a object that may be stored in a data store. In some embodiments, nonce keys may be generated based on random number generators. Note, in some embodiments, key generators may be arranged to confirm that the combination of key values in key containers are unique values across the schedule management platform.

In one or more of the various embodiments, employing base 36 enables key container to represent a large key spaces using less storage than base 10 or base 16. For example, if a Unix timestamp value represented in base 10 for the current time is 1603774292, the timestamp key value QIUG5W may be used to represent the timestamp value using a base 36 timestamp key. Likewise, for example, if the same timestamp value is represented in base 16, it would be represented as 5F97A754. Thus, in this example, representing timestamp keys using base 36 reduces storage requirements for timestamps by 4 bytes (32-bits) as compared to base 10 representation. Similarly, in this example, representing timestamp keys using base 36 reduces storage requirements for timestamps by 2 bytes (16-bits) as compared to base 16 representation.

In one or more of the various embodiments, storage engines may be arranged to employ key containers as keys or primary keys to located objects in data stores. Accordingly, in one or more of the various embodiments, storage engines may be arranged to employ key containers, such as, key container 708 to determine objects in a data store. For example, object 710 may be provided by storage engine 702 based on key container 708.

Generalized Operations

FIGS. 8-12 represent generalized operations for scalable data management in accordance with one or more of the various embodiments. In one or more of the various embodiments, processes 800, 900, 1000, 1100, and 1200 described in conjunction with FIGS. 8-12 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-12 may be used for scalable data management in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by scheduling engine 322, identity engine 324, storage engine 326, or the like, running on one or more processors of one or more network computers.

Figure 8:
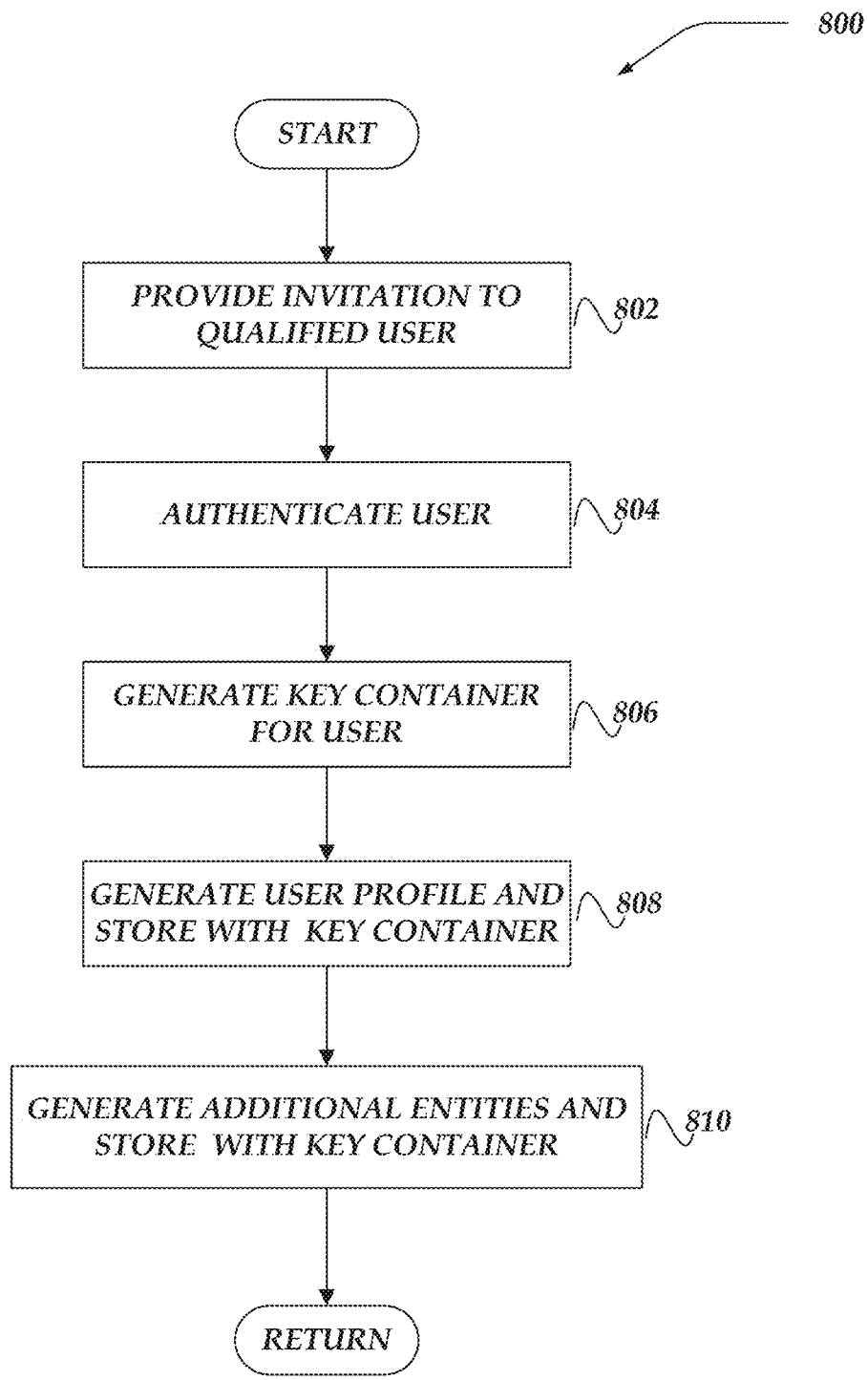
FIG. 8 illustrates a flowchart of a process for scalable data management in accordance with one or more of the various embodiments.

FIG. 8 illustrates a flowchart of process 800 for scalable data management in accordance with one or more of the various embodiments. After a start block, at block 802, in one or more of the various embodiments, an invitation to register with a service provider may be provided to a qualified user from a schedule management platform. In one or more of the various embodiments, clients or users interested in joining schedule management platforms may submit requests for an invitation. Likewise, in some embodiments, users associated with service providers or schedule management platforms, may be enabled to directly invite clients, patients, or the like, to join schedule management platforms.

At block 804, in one or more of the various embodiments, the schedule management platform may be arranged to authenticate the qualified user. In one or more of the various embodiments, responses to invitations may include various credentials that enable identity engines to authenticate or validate users attempting to register with schedule management platforms. In some embodiments, storage engines may be arranged to require manual acceptance from administrator users, resources, providers, or the like, before accepting users.

In some embodiments, identity engines may be arranged to execute authentication protocols defined by configuration information to account for local security requirements or other local circumstances. For example, in some embodiments, a first schedule management platform may be configured to accept certain credentials for authenticating users while a second schedule management platform may be configured to accept different credentials.

As described above, in some embodiments, identity engines may be arranged access other user authentication services, such as, LDAP servers, Active Directory servers, OAuth systems, or the like, for authenticating new users.

At block 806, in one or more of the various embodiments, the schedule management platform may be arranged to generate a key container for the user. In one or more of the various embodiments, each user in a schedule management platform may be associated with a key container that includes keys that may embed storage information, or the like, that may be used to determine data centers or data stores for storing objects associated with the user. Key container generation is discussed in more detail below.

At block 808, in one or more of the various embodiments, the schedule management platform may be arranged to generate user profile information for the user. In some embodiments, the user profile information may be stored with the key container. In one or more of the various embodiments, identity engines may be arranged to collect various user profile information, such as, username, email addresses, passwords, or the like, that may comprise user profiles. In some embodiments, identity engines may be arranged to determine the requirements attributes or required attribute collection protocols based on configuration information to account for local requirements or local circumstances.

At block 810, in one or more of the various embodiments, the schedule management platform may be arranged to generate one or more other objects that may be associated with the user. In one or more of the various embodiments, these objects may be stored in a data store with the key container that corresponds to the user. In some embodiments, key containers may be employed as index keys, or the like, for one or more object types. In some embodiments, one or more object types may be arranged to store key containers as attributes of object instances. In other embodiments, one or more object types may be associated with key containers based on mapping or relation tables that associate key containers with other object identifiers.

Next, in one or more of the various embodiments, control may be returned to a calling process.

Figure 9:
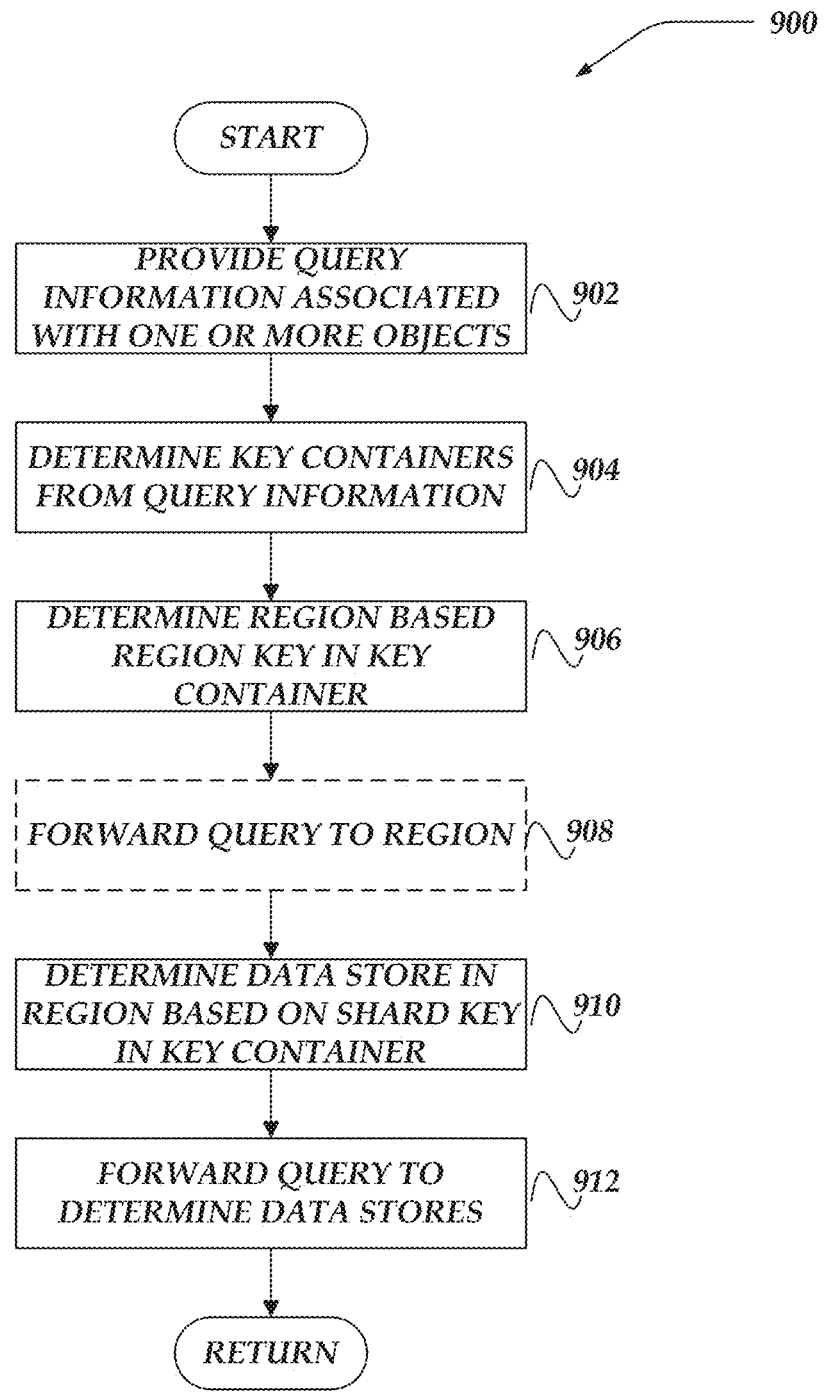
FIG. 9 illustrates a flowchart of a process for scalable data management in accordance with one or more of the various embodiments.

FIG. 9 illustrates a flowchart of process 900 for scalable data management in accordance with one or more of the various embodiments. After a start block, at block 902, in one or more of the various embodiments, query information associated with one or more objects may be provided to a storage engine. In one or more of the various embodiments, scheduling engines, or the like, may be arranged to provide query information to storage engines. In one or more of the various embodiments, the query information may include information that storage engines may interpret to construct or execute queries against data stores.

In one or more of the various embodiments, query information may be assumed to include one or more expressions or statements associated object retrieval, object filtering, object sorting, object grouping, updating objects, deleting objects, moving objects, or the like. Also, in some embodiments, query information may include instructions or information that results in more than one data store operation. For example, query information may include looking up one or more objects, updating one or more of those objects, and saving the one or more updated objects.

In one or more of the various embodiments, objects or references to objects may be included in the query information. Alternatively, in some embodiments, query information may include query information may include object information generated by exporting or serialization object information into format that may be included in query information. For example, one or more objects may be serialized to one or more JSON objects that may be included in the query information.

At block 904, in one or more of the various embodiments, storage engines may be arranged to determine key container information from query information. In one or more of the various embodiments, key containers may be included in the query information. Likewise, in some embodiments, object information included in the query information may include key containers or references to key containers that correspond to one or more of the object references or objects included in the query information.

At block 906, in one or more of the various embodiments, storage engines may be arranged to determine one or more regions based on region keys included in the key containers. As described above, key containers may be arranged to include region key values that may correspond to regional data centers.

At block 908, in one or more of the various embodiments, optionally, storage engines may be arranged to forward the query information to one or more other regions. For example, in some embodiments, a user associated with one region may be accessing the schedule management platform from another region. Accordingly, in some embodiments, query information associated with such users may be forwarded to a different data center for processing.

In one or more of the various embodiments, storage engines may be arranged to employ route models, rules, or the like, provided via configuration information to determine the data center that corresponds to a region key value.

Note, this block is indicated as being optional, because forwarding of the query information to another region may be omitted if the query information may be initially provided to the correct region. In such cases, storage engines may be arranged to confirm that region keys match the local region.

At block 910, in one or more of the various embodiments, storage engines may be arranged to determine one or more data stores in the region based on shard keys included in the key containers. Similar to determine a region based on a region key values, storage engines may be arranged to determine data stores based on shard key values in key containers.

In one or more of the various embodiments, storage engines may be arranged to employ route models, rules, or the like, provided via configuration information to determine the data stored that corresponds to a shard key value.

At block 912, in one or more of the various embodiments, storage engines may be arranged to forward the some or all of the query information to the determined data stores. In one or more of the various embodiments, storage engines may be arranged to forward the portions of the query information to the data store that corresponds to the shard key. In some embodiments, storage engines may be arranged to re-write or otherwise generate local query information that conforms to the requirements of the data store. For example, if the data store is a key value stores, local query information may be generated to employ the key containers as keys and the object information as the values. Likewise, for example, if the data store is a relational database, the storage engines may be arranged to generate one or more SQL expressions or SQL statements based on the query information. Accordingly, in some embodiments, the local query information sent to the data stores may depend on the type of data store. In some embodiments, a data center may include data stores of different types. Thus, in some embodiments, the local query information generated by storage engines may depend on the type of data store that corresponds to the shard key values in the relevant key containers.

Next, in one or more of the various embodiments, control may be returned to a calling process.

Figure 10:
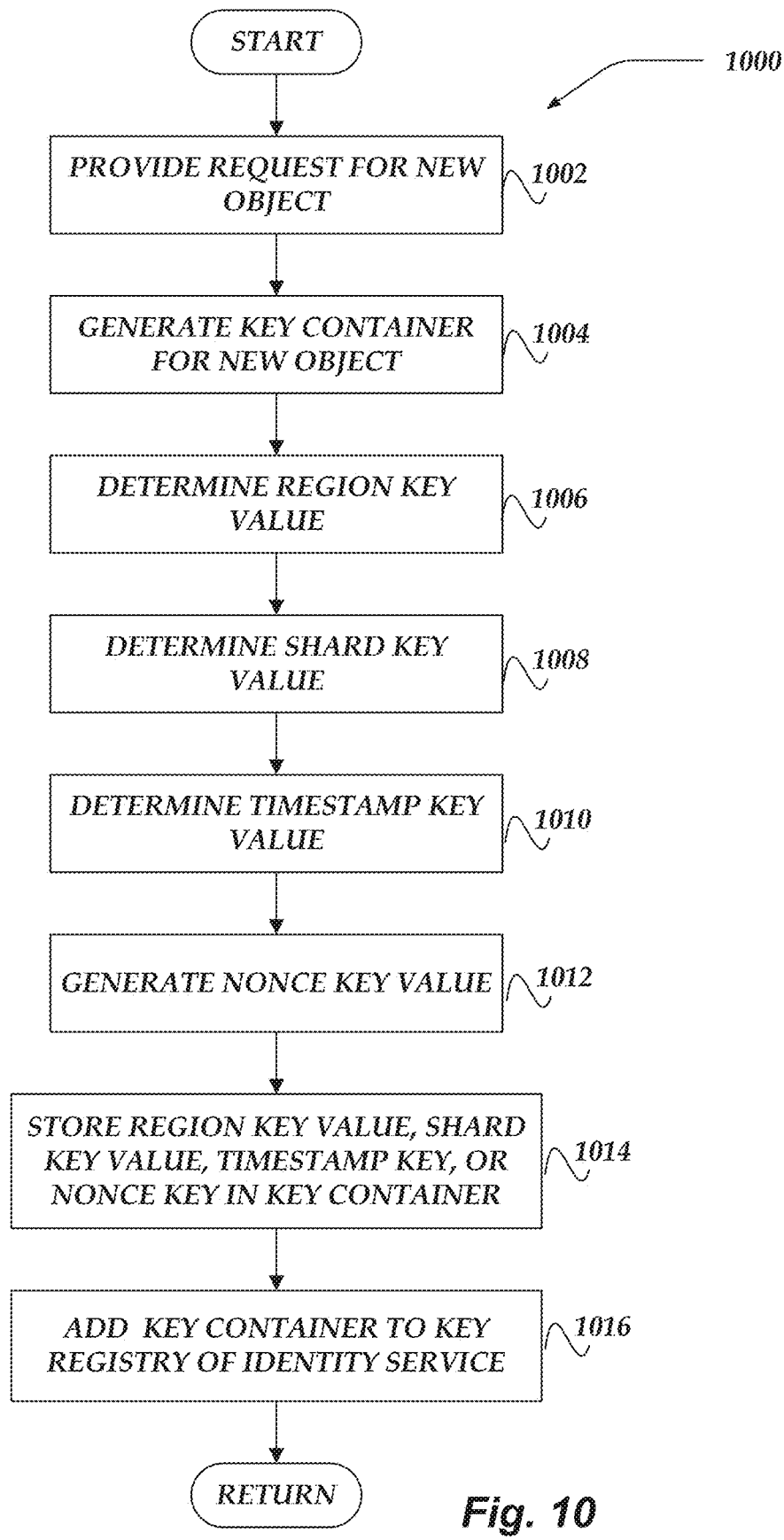
FIG. 10 illustrates a flowchart of a process for generating key containers for scalable data management in accordance with one or more of the various embodiments.

FIG. 10 illustrates a flowchart of process 1000 for generating key containers for scalable data management in accordance with one or more of the various embodiments. After a start block, at block 1002, in one or more of the various embodiments, a storage engine may be arranged to provide one or more requests to generate one or more new objects.

As described above, storage engines may be arranged to provide data management services for various applications/ services such as schedule management platforms. Accordingly, in some embodiments, as application objects may be created, scheduling engines may provide them to storage engines for storage. For example, if a new user or client registers with a service provider, scheduling engines may be arranged to create the various objects that represent the new user. Thus, in this example, these objects may be provided to storage engines for storing in data centers or data stores on behalf of schedule management platforms, or the like.

At block 1004, in one or more of the various embodiments, the storage engine may be arranged to generate an empty key container for each of the one or more new objects. In one or more of the various embodiments, storage engines may be configured to associate key containers with one or more object types. Thus, in some embodiments, if one or more of the objects require key containers, storage engines may be arranged to allocate or otherwise generate empty key containers for the incoming objects. In some embodiments, empty key containers may be data structures that are sized or aligned (in computer memory) to enable the inclusion of various key values.

In one or more of the various embodiments, one or more objects or object types may be configured to include one or more attributes for storing or referencing key containers. Alternatively, in some embodiments, another table or data store may be arranged to associate objects with key containers.

At block 1006, in one or more of the various embodiments, the storage engine may be arranged to determine a region key value for each of the one or more objects.

In one or more of the various embodiments, storage engines may be arranged to generate a single digit base 36 number that corresponds to a region. In some embodiments, storage engines may be arranged to employ rules, instructions, or the like, provided via configuration information for setting region key values for objects. For example, in some embodiments, geo-location information associated with one or more objects may be employed to automatically determine an initial region key value. Also, in some embodiments, schedule management platforms may be configured to automatically assign region key values to objects depending on associated service providers. For example, for some embodiments, if the service provider associated with the one or more objects is a health clinic in Philadelphia, a region key value that correspond to a data center that services the Philadelphia region may be automatically determined for the one or more objects.

At block 1008, in one or more of the various embodiments, the storage engine may be arranged to determine a shard key value for each of the one or more objects. Similar to determining region key values, storage engines may be arranged to employ rules, instructions, or the like, provided via configuration information for setting shard key values for objects. In some embodiments, storage engines may be arranged to determine shard key values based on generating a random single digit base 36 number. However, in some embodiments, even though a single digit shard key may have a range of 0-35 (0-Z), there may be fewer or more data stores in a data center.

In one or more of the various embodiments, storage engines may be arranged to assign one or more specific shard key values to particular objects or object types. For example, in some embodiments, a storage engine may be configured to set shard key values for objects associated with administrators to a fixed values, such as, 0, or the like. Accordingly, in this example, all objects associated with administration of the scheduling engine may be stored on one data store.

At block 1010, in one or more of the various embodiments, the storage engine may be arranged to determine a timestamp key value for each of the one or more objects.

In one or more of the various embodiments, timestamp keys may be used to represent a time such as creation time for an object or a key container. In one or more of the various embodiments, including timestamps in key containers provides a monotonically increasing value that provides structure or timeline information. For example, a query to find all objects created during a time range may be implemented based on timestamp key values included in key containers.

In one or more of the various embodiments, storage engines may be arranged to truncate or round timestamps to large time periods than provided by a time service or operating system. For example, in some embodiments, if the operating system reports timestamps in terms of milliseconds, a storage engine may be configured to round timestamp values to seconds, minutes, hours, or the like, depending on local circumstances or local requirements. Further, in some embodiments, storage engines may be arranged to omit timestamp keys from key containers for one or more object types.

At block 1012, in one or more of the various embodiments, the storage engine may be arranged to generate a nonce key value for each of the one or more objects. In one or more of the various embodiments, nonce key values comprised of randomly generated multi-digit base 36 numbers. Thus, in some embodiments, if two key containers have region keys, shard keys, and timestamp keys that match, the nonce keys may be different, enabling the two key containers to be distinguished from each other.

In one or more of the various embodiments, storage engines may be arranged to determine the number of base 36 digits for nonce keys based on configuration information. Likewise, in some embodiments, one or more different object types may be configured to have a different number of base 36 digits.

At block 1014, in one or more of the various embodiments, the storage engine may be arranged to store the region keys, the shard keys, the timestamp keys, the nonce keys, or the like, in the key container of their respective objects.

In one or more of the various embodiments, key containers may be arranged to store various keys in defined locations. In some embodiments, region keys may be stored in the first element of a key container, shard keys may be stored in the second element, or the like, with the specific key positions defined via configuration information to account for local circumstances or local requirements.

At block 1014, in one or more of the various embodiments, the storage engine may be arranged to add the key container to a key registry managed by an identity engine. In one or more of the various embodiments, identity engines may be arranged to ensure the key containers can be employed to uniquely identify objects in schedule management platforms. Accordingly, in some embodiments, identity engines, or the like, may be arranged to maintain a registry of key containers that may track if they are in use, which object or object types may be associated with a given key container, or the like. In some embodiments, identity engines or storage engines may be arranged to test if a new key container is unique before finalizing its association with an object or user.

In some embodiment, if the combination of key values in a key container does not result in a unique key container, storage engines or identity engines may be arranged to regenerate the key container to generate a unique key container. In some embodiments, identity engines or storage engines may be arranged to regenerate one or more keys, such as, randomly generated nonce keys until the combination of keys in a key container is unique in a defined scope. For example, identity engines may be configured to guarantee that some objects (or key containers) are unique within data center whereas other objects or object type may require key containers that are unique across entire schedule management platforms.

Next, in one or more of the various embodiments, control may be returned to a calling process.

Figure 11:
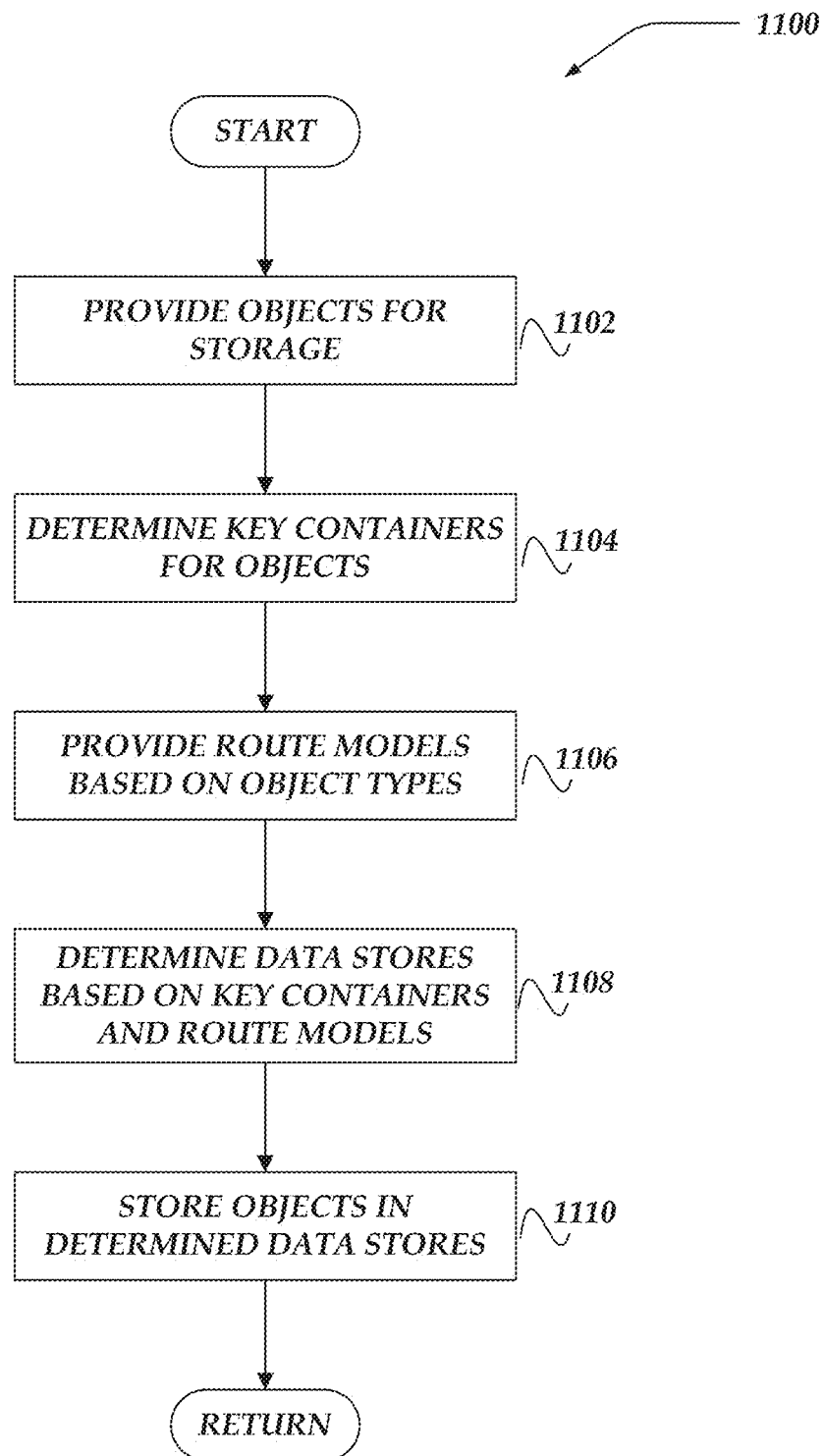
FIG. 11 illustrates a flowchart of a process for storing objects for scalable data management in accordance with one or more of the various embodiments.

FIG. 11 illustrates a flowchart of process 1100 for storing objects for scalable data management in accordance with one or more of the various embodiments. After a start block, at block 1102, in one or more of the various embodiments, one or more objects may be provided to a storage engine for storage. As described above, storage engines may be arranged to provide data management services for applications/services such as schedule management platforms. Accordingly, in some embodiments, scheduling engines may be arranged to retrieve or modify objects and then provide them to storage engines for storage. For example, if a user or client updates their user profile information, scheduling engines may be arranged to update one or more of the various objects that may be associated with the user. Thus, in this example, these objects may be provided to storage engines for storing in data stores on behalf of the schedule management platform.

At block 1104, in one or more of the various embodiments, the storage engine may be arranged to determine the key containers for the one or more objects. As described above, one or more objects may be associated with key containers. For example, in some embodiments, schedule management platforms may be arranged to associate users (e.g., clients, patients, providers, resources, or the like) with key containers. Accordingly, in some embodiments, objects associated with users, or the like, may be associated with corresponding key containers.

In one or more of the various embodiments, one or more objects may be arranged to store relevant key containers as attributes.

At block 1106, in one or more of the various embodiments, the storage engine may be arranged to provide one or more route models based on the object types of the one or more objects being stored. In one or more of the various embodiments, route models may provide rules for interpreting key containers. In some embodiments, different object types may employ different route models. Likewise, in some embodiments, different data centers or different schedule management platforms deployment may be configured to use different route models.

In one or more of the various embodiments, storage engines may be arranged to employ one default route model for each type of object rather than employing one or more different route models based on object types.

At block 1108, in one or more of the various embodiments, the storage engine may be arranged to determine one or more data stores for storing the one or more objects based on the one or more key containers and the one or more route models. As described above, key containers may include region keys or shard keys that may be interpreted to determine associated data centers or data stores. For example, for some embodiments, route models may be configured to map shard key values to particular data stores. Likewise, for example, route models may be configured to map region key values to particular data centers.

At block 1110, in one or more of the various embodiments, the storage engine may be arranged to store the one or more objects in the one or more determined data stores. In one or more of the various embodiments, storage engines may be arranged to provide (or forward) the one or more objects to their designated data stores for storage. In some embodiments, if one or more objects are associated with a different region (or data center), storage engines may be arranged to forward the objects to a storage engine responsible for that region or data center. Alternatively, in some embodiments, storage engines may be arranged to manage storage for more than one data center region.

In one or more of the various embodiments, data stores may be arranged to provide interfaces or APIs that enable storage engines to forward objects with key containers for storage. In some embodiments, storage engines may be arranged to generate instructions, code, expressions, or the like, that may be interpreted by the data stores. Also, in some embodiments, storage engines may be arranged to provide one or more to data stores using one or more interfaces or APIs that encapsulate one or more actions associated with storing objects on data stores.

Next, in one or more of the various embodiments, control may be returned to a calling process.

Figure 12:
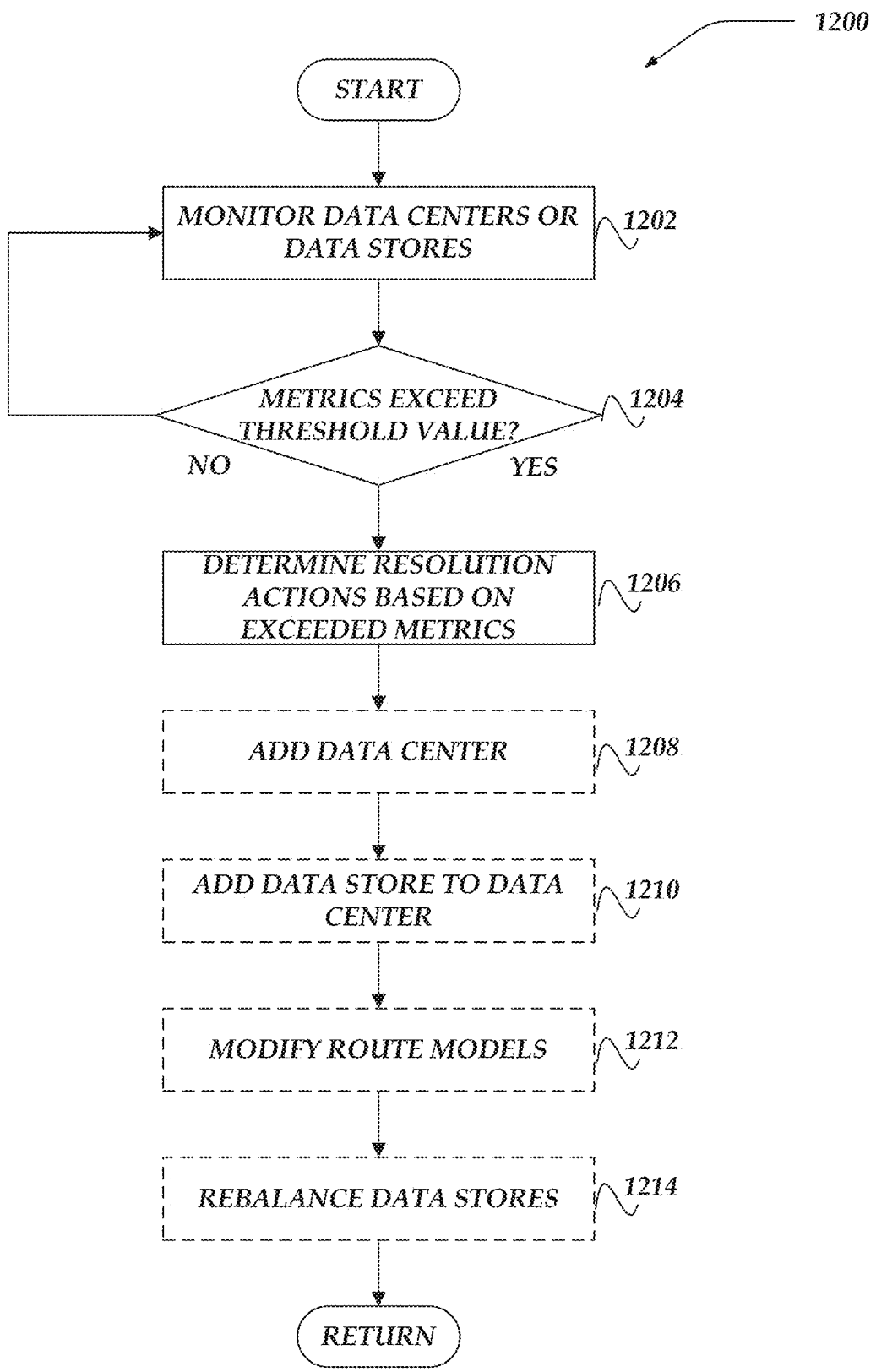
FIG. 12 illustrates a flowchart of a process for automatically scaling data centers for scalable data management in accordance with one or more of the various embodiments.

FIG. 12 illustrates a flowchart of process 1200 for automatically scaling data centers for scalable data management in accordance with one or more of the various embodiments. After a start block, at block 1202, in one or more of the various embodiments, storage engines may be arranged to monitor one or more metrics associated with one or more data center or one or more data stores.

In one or more of the various embodiments, storage engines may be arranged to various performance metrics associated with the data stores in data centers. In some embodiments, storage engines may be arranged to directly monitor one or more metrics by employing one or more APIs provided via operating systems, file systems, or the like. Also, in some embodiments, storage engines may be arranged to integrate with one or more performance monitoring services that may collect one or more data store metrics. In some embodiments, monitored metrics may include available storage capacity, latency, input/output operations per second (IOPS), throughput, network congestion, CPU utilization, or the like. In some embodiments, storage engines may be arranged to determine the specific metrics to monitor based on configuration information to account for local requirements or local circumstances.

At decision block 1204, in one or more of the various embodiments, if one or more metrics exceed one or more threshold values, control may flow to block 1206; otherwise, control may loop back to block 1202. In one or more of the various embodiments, the one or more monitored metrics may be associated with various rules, conditions, threshold values, quota values, or the like, that may indicate data stores associated with a storage engine may require attention or maintenance. In one or more of the various embodiments, storage engines may be arranged to configuration information to determine the relevant rules, conditions, threshold values, quota values, or the like, for identifying issues. For brevity and clarity, herein these various rules, conditions, threshold values, quota values, or the like, may be referred to as metric threshold values or thresholds. Thus, in some embodiments, if one or more metrics associated with data centers or data stores exceed one or more thresholds, storage engines may be arranged to perform various actions to resolve or investigate the reasons behind the one or more metrics exceeding their thresholds.

Also, in one or more of the various embodiments, one or more metrics may be associated with scheduling engines or schedule management platforms. In some embodiments, storage engines may be arranged to monitor one or more metrics associated with the operation of the scheduling engine, such as, number of clients, number of users, number of concurrent users, average data consumption per time-period, rate of user growth, or the like. Accordingly, schedule management platforms may provide one or more APIs or interfaces that enable storage engines to monitor one or more of these application level metrics. Also, in some embodiments, scheduling engines may be configured to provide notification or alert to directly to storage engines. Similarly, scheduling engines may be arranged to provide notification or alerts to other monitoring services that storage engines may be configured to monitor.

At block 1206, in one or more of the various embodiments, the storage engine may be arranged to determine one or more resolution actions based on the one or more metrics that exceed their respective thresholds. In one or more of the various embodiments, storage engines may be arranged to associate one or more resolution actions to various metrics. For example, in some embodiments, if available capacity may be less than a threshold value, storage engines may be configured to execute a series of instructions directed to resolving the issues. Accordingly, in some embodiments, storage engines may be arranged to employ rules, instructions, or the like, provided via configuration information to determine the particular resolutions actions. In some embodiments, resolution actions may be limited to providing notification or alerts to one or more users. In contrast, other resolution actions may operate automatically.

At block 1208, in one or more of the various embodiments, optionally, the storage engines may be arranged to add another data center. In some cases, a large geographic region that may be serviced by a single data center may be split into two or more smaller regions, each associated with a data center. For example, in one or more of the various embodiments, a schedule management platform may initially be deployed with two data centers, each servicing half of a country. In this example, as the number of users of schedule management platform increase beyond a threshold values, additional regions may be established, each with their data centers.

Note, this block is indicated as being optional because, in some cases, resolving the one or more issues (if any) associated with the one or more metrics that exceed their respective threshold values may not include adding another data center.

At block 1210, in one or more of the various embodiments, optionally, the storage engine may be arranged to add one or more or more data stores to one or more data centers. In some embodiments, storage engines with access to cloud environments or other elastic storage options may be arranged to automatically provision additional data stores for a data center. For example, in some embodiments, a storage engine may be configured to automatically add data stores as the number of users increase. In some embodiments, storage engines may be arranged to execute one or more provisioning instructions that enable the automatic provisioning of data stores in a data center.

Note, this block is indicated as being optional because, in some cases, resolving the one or more issues (if any) associated with the one or more metrics that exceed their respective threshold values may not include adding data stores.

At block 1212, in one or more of the various embodiments, the storage engine may be arranged to modify one or more route models. In one or more of the various embodiments, route models may be arranged to determine how to map key container keys to data centers or data stores. For example, if a data center has two data stores, route models may be configured to map the lower range of shard key values to one data stores and the upper range of shard key values to the second data store. However, in some embodiments, if additional data stores are added to a data center, the route model may be modified to divide the shard key space into thirds mapping the lower third of the range to first data store, the middle third of the range to a second data store, the upper third of the range to a third data stores, or the like.

In one or more of the various embodiments, modified route models enables storage engines to direct the objects to difference data stores or data centers without modifying key containers associated objects.

Note, this block is indicated as being optional because, in some cases, resolving the one or more issues (if any) associated with the one or more metrics that exceed their respective threshold values may not include modifying route models.

At block 1214, in one or more of the various embodiments, optionally, the storage engine may be arranged to re-balance data storage across one or more data stores. In some embodiments, if new data stores may be added to a data center, the new data stores may be essentially empty, while the other data stores may remain full. Also, in some embodiments, route models changes may result in one or more objects being stored on data stores that do not match their key containers.

Accordingly, in some embodiments, storage engines may be arranged to execute various re-balancing strategies, such as, explicitly moving objects to the correct data stores. Also, in some embodiments, storage engines may be arranged to re-balance data stores by lazily moving objects such that they may be moved if they are accessed or updated.

Also, in some embodiments, storage engines may be arranged to apply different re-balancing strategies for different object types. Accordingly, in some embodiments, storage engines may be configured to prioritize re-balancing for some types of objects over other objects.

Next, in one or more of the various embodiments, control may be returned to a calling process.

Note, this block is indicated as optional because in some embodiments scheduling engines may be arranged to use the qualified clients determined in block 1002 rather than determining new qualified clients.

At block 1018, in one or more of the various embodiments, the scheduling engine may be arranged to provide invitations to clients in the determined qualified clients. In some embodiments, scheduling engines may be arranged to apply the same or different rules that was used for providing invitations to the initial list of qualified clients. For example, for some embodiments, scheduling engines may be arranged to broadcast notifications to the qualified clients rather employing serial notifications. In some embodiments, the scheduling engines may be arranged to sequentially notify each qualified client in the serial notification list and if the appointment remains open and available, the scheduling engine may be configured broadcast the notification to the same qualified clients in the list. In other circumstances, for other appointments, providers, or organizations, the scheduling engine may be arranged to generate another list of qualified clients and continue performing serial notifications.

Next, in one or more of the various embodiments, control may be returned to a calling process.

FIG. 11 illustrates a flowchart of process 1100 for registering clients or providers with a schedule management platform for availability based resource scheduling in accordance with one or more of the various embodiments. After a start block, at block 1102, in one or more of the various embodiments, one or more clients or one or more providers may provide credential information to a scheduling engine. As described above, scheduling engines may be arranged to enable clients or providers to sign up directly with a schedule management platform.

In one or more of the various embodiments, schedule management platforms may be arranged to provide various options that may enable users (e.g., clients or providers) to provide credential information, including, mobile applications, web applications, desktop applications, automated attendants, interactive voice response systems, interactive chat robots, live client agents, or the like.

In some embodiments, scheduling engines may be arranged to enable organizations, clients, providers, or the like, to determine the evidence that may be required to authenticate users. Similarly, in some embodiments, scheduling engines may be arranged to enable organizations, service providers, clients, providers, or the like, to determine or configure the security protocols to put in place, such as, two-factor authorization, personal cryptographic certificates, or the like.

At block 1104, in one or more of the various embodiments, optionally, the scheduling engine may be arranged to determine one or more providers for the client. In one or more of the various embodiments, schedule management platforms may be arranged to be open, closed, multi-tenant, single tenant, or the like. Accordingly, in one or more of the various embodiments, scheduling engines may be arranged to enable organizations to configure schedule management platforms to determine the providers that may be available to a client in a given context. For example, in some embodiments, closed platforms may limit clients to a particular set of providers. In some embodiments, closed schedule management platforms may strictly define the providers that may be determined for a given client. In contrast, in some embodiments, open schedule management platforms may enable clients to select freely from all the providers that may be included on the schedule management platform.

In one or more of the various embodiments, schedule management platforms may be arranged to enable individual providers or groups of providers to define criteria that may be used to filter or pre-qualify clients. For example, in some embodiments, providers that operate within a restricted or limited geographic area may be enabled to exclude clients that are outside the area.

Further, in some embodiments, schedule management platforms may be arranged to enable providers and clients to link up by exchange pin numbers, passwords, or the like. For example, an independent provider may provider clients a code or pin number that may be provided as part of the client's credentials. Accordingly, in some embodiments, scheduling engines may be arranged to pair the client with the provider(s) that correspond to the provided code or pin number.

In one or more of the various embodiments, schedule management platforms may be arranged to enable clients send requests for association to providers that the providers may accept or deny. For example, in some embodiments, scheduling engines may be arranged to provide a list of providers to a client. The client may send one or more providers in the list a request to associate. Thus, if the provider accepts the request, the client and provider may be associated.

Note, this block is indicated as being optional because for some embodiments the pending user may be a provider rather than a client.

At block 1106, in one or more of the various embodiments, optionally, the scheduling engine may be arranged to determine the clients for the provider. Similar to as described for block 1104, scheduling engines may be arranged to determine one or more clients for a provider. In some embodiments, schedule management platforms may be arranged to enable organizations to configure the schedule management platform to automatically associate a set of clients with a provider based on the clients prior associated with the organization. For example, in some embodiments, a health clinic may configure the schedule management platform to automatically associate providers and clients based on existing information that has already been used to associate clients and providers.

In some embodiments, scheduling engines may be arranged to enable organizations that are membership oriented to automatically associate some or all of their providers with clients that are members of the organization. For example, in some embodiments, health clinics that have providers and patients may configure the schedule management platform to automatically associate their providers and patients. Likewise, in some embodiments, a fitness center may configure a schedule management platform to automatically associate its members (e.g., clients) with its providers (e.g., physical trainers, massage therapists, or the like).

Note, this is indicated as being optional because in some embodiments the pending user may be a client rather than a provider.

At block 1108, in one or more of the various embodiments, optionally, scheduling engines may be arranged to enable clients or providers to integrate with one or more calendar systems. In some embodiments, scheduling engines may be arranged to request permission for providers or clients to access one or more their calendar. Accordingly, in some embodiments, scheduling engines may be arranged to employ client/provider calendar information to provide scheduling decisions or recommendations. For example, for some embodiments, scheduling engines may be arranged to use client calendar information to determine in part if clients should be offered/notified of open appointments.

In one or more of the various embodiments, scheduling engines may be arranged to integrate with an organizations internal scheduling or planning system to obtain calendar information for providers.

Note, this block is indicated as being optional because in some embodiments schedule management platforms or organizations may not enable or require calendar integration.

At block 1110, in one or more of the various embodiments, the client or provider may be registered with the schedule management platform. In one or more of the various embodiments, scheduling engines may be arranged to associate the client with one or more providers (or organizations). Likewise, in some embodiments, scheduling engines may be arranged to associate a provider with one or more clients or organizations.

In one or more of the various embodiments, registering clients or providers enables scheduling engines to determine which clients should be notified for a given open appointment slot. However, in some embodiments, scheduling engines may be arranged to enable organizations to provide or modify the rules for determining which clients should be notified for a given open appointment.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing resources over a network using one or more network computers that include one or more processors that perform actions, comprising:

determining a data center and a data store for one or more provided objects that correspond to a separate container that includes a region key and a shard key; and in response to metric information, performing further actions, including:
associating the shard key included in the separate containers to one or more other data stores added to the data center; and
determining one or more other data centers and one or more other data stores for one or more subsequently provided objects based on each region key and each shard key included in each separate container that corresponds to the one or more subsequently provided objects, wherein each shard key corresponds to the one or more other data stores.

2. The method of claim 1, wherein the separate container further comprises a nonce key for determining individual objects in the data store.

3. The method of claim 1, further comprising:
storing each object and its corresponding separate container in the data store at the data center; and
wherein each separate container associated with the one or more objects and the one or more subsequently provided objects are unchanged.

4. The method of claim 1, wherein the region key corresponds to the data center and the shard key corresponds to the data store.

5. The method of claim 1, further comprising:
associating the metric information with one or more of the data store or the data center; and wherein the response to metric information further comprises one or more metrics exceeding a threshold.

6. The method of claim 1, further comprising:
in response to receiving a query that includes one or more query containers that correspond to one or more query objects, performing further actions, including:
determining one or more query region keys and one or more query shard keys from the one or more query containers, wherein each value the one or more query region keys are base 36 numbers at a first position in each query key container;
determining one or more query data centers based on the one or more query region keys;
determining one or more query data stores in the one or more query data centers based the one or more query shard keys, wherein the one or more query data stores are in the one or more query data centers;
determining the one or more query objects in the one or more query data stores based on a value of each nonce key included in each query container, wherein each nonce key corresponds to a query object; and
providing a result for the query that includes the one or more query objects.

7. The method of claim 1, wherein providing the one or more objects, further comprises:
registering one or more clients or one or more resources with a provider;
generating the one or more objects based on the one or more clients or the one or more resources;
generating one or more containers that each correspond to one of the one or more objects;
generating a region key value for each object based on one or more data centers, wherein each region key value corresponds to one data center;
generating a shard key value for each object based on a random number generator, wherein each shard key value corresponds to one data store;

generating a nonce key value for each object based on a random number generator, wherein each digit of the nonce is a base 36 number to reduce a size of the one or more containers; and storing the region key value, the shard key value, and the nonce key value for each object in a corresponding container, wherein the region key value is stored in a first element of the corresponding container, and wherein the shard key value is stored in a second element of the corresponding container, and wherein the nonce key value is stored in a remainder of elements in the corresponding container.

8. A network computer for managing resources over a network, comprising:
a memory that stores at least instructions; and
one or more processors that execute instructions that perform actions, including:
determining a data center and a data store for one or more provided objects that correspond to a separate container that includes a region key and a shard key; and
in response to metric information, performing further actions, including:
associating the shard key included in the separate containers to one or more other data stores added to the data center; and
determining one or more other data centers and one or more other data stores for one or more subsequently provided objects based on each region key and each shard key included in each separate container that corresponds to the one or more subsequently provided objects, wherein each shard key corresponds to the one or more other data stores.

9. The network computer of claim 8, wherein the separate container further comprises a nonce key for determining individual objects in the data store.

10. The network computer of claim 8, further comprising:
storing each object and its corresponding separate container in the data store at the data center; and
wherein each separate container associated with the one or more objects and the one or more subsequently provided objects are unchanged.

11. The network computer of claim 8, wherein the region key corresponds to the data center and the shard key corresponds to the data store.

12. The network computer of claim 8, further comprising:
associating the metric information with one or more of the data store or the data center; and wherein the response to metric information further comprises one or more metrics exceeding a threshold.

13. The network computer of claim 8, further comprising:
in response to receiving a query that includes one or more query containers that correspond to one or more query objects, performing further actions, including:
determining one or more query region keys and one or more query shard keys from the one or more query containers, wherein each value the one or more query region keys are base 36 numbers at a first position in each query key container;
determining one or more query data centers based on the one or more query region keys;
determining one or more query data stores in the one or more query data centers based the one or more query shard keys, wherein the one or more query data stores are in the one or more query data centers;
determining the one or more query objects in the one or more query data stores based on a value of each nonce key included in each query container, wherein each nonce key corresponds to a query object; and
providing a result for the query that includes the one or more query objects.

14. The network computer of claim 8, wherein providing the one or more objects, further comprises:
registering one or more clients or one or more resources with a provider;
generating the one or more objects based on the one or more clients or the one or more resources;
generating one or more containers that each correspond to one of the one or more objects;
generating a region key value for each object based on one or more data centers, wherein each region key value corresponds to one data center;
generating a shard key value for each object based on a random number generator, wherein each shard key value corresponds to one data store;
generating a nonce key value for each object based on a random number generator, wherein each digit of the nonce is a base 36 number to reduce a size of the one or more containers; and
storing the region key value, the shard key value, and the nonce key value for each object in a corresponding container, wherein the region key value is stored in a first element of the corresponding container, and wherein the shard key value is stored in a second element of the corresponding container, and wherein the nonce key value is stored in a remainder of elements in the corresponding container.

15. A processor readable non-transitory storage media that includes instructions for managing resources over a network, wherein execution of the instructions by one or more hardware processors performs actions, comprising:
determining a data center and a data store for one or more provided objects that correspond to a separate container that includes a region key and a shard key; and
in response to metric information, performing further actions, including:
associating the shard key included in the separate containers to one or more other data stores added to the data center; and
determining one or more other data centers and one or more other data stores for one or more subsequently provided objects based on each region key and each shard key included in each separate container that corresponds to the one or more subsequently provided objects, wherein each shard key corresponds to the one or more other data stores.

16. The processor readable non-transitory storage media of claim 15 that includes instructions for managing resources over a network, wherein the separate container further comprises a nonce key for determining individual objects in the data store.

17. The processor readable non-transitory storage media of claim 15 that includes instructions for managing resources over a network, wherein execution of the instructions by one or more hardware processors performs further actions, comprising:
storing each object and its corresponding separate container in the data store at the data center; and
wherein each separate container associated with the one or more objects and the one or more subsequently provided objects are unchanged.

18. A system for managing resources over a network, comprising:
  a network computer, comprising:
    a memory that stores at least instructions; and
    one or more processors that execute instructions that perform actions, including:
      determining a data center and a data store for one or more provided objects that correspond to a separate container that includes a region key and a shard key; and
      in response to metric information, performing further actions, including:
        associating the shard key included in the separate containers to one or more other data stores added to the data center; and
        determining one or more other data centers and one or more other data stores for one or more subsequently provided objects based on each region key and each shard key included in each separate container that corresponds to the one or more subsequently provided objects, wherein each shard key corresponds to the one or more other data stores; and
  a client computer, comprising:
    another memory that stores at least instructions; and
    one or more processors that execute instructions that perform actions, including:
      providing one or more requests associated with the one or more objects.

19. The system of claim 18, further comprising:
  storing each object and its corresponding separate container in the data store at the data center; and
  wherein each separate container associated with the one or more objects and the one or more subsequently provided objects are unchanged.

20. The system of claim 18, further comprising:
  in response to receiving a query that includes one or more query containers that correspond to one or more query objects, performing further actions, including:
    determining one or more query region keys and one or more query shard keys from the one or more query containers, wherein each value the one or more query region keys are base 36 numbers at a first position in each query key container;
    determining one or more query data centers based on the one or more query region keys;
    determining one or more query data stores in the one or more query data centers based the one or more query shard keys, wherein the one or more query data stores are in the one or more query data centers;
    determining the one or more query objects in the one or more query data stores based on a value of each nonce key included in each query container, wherein each nonce key corresponds to a query object; and
    providing a result for the query that includes the one or more query objects.

* * * * *